United States Patent
Ahmadi-Ardakani

(10) Patent No.: US 10,216,442 B2
(45) Date of Patent: Feb. 26, 2019

(54) LOCATION-AWARE BEHAVIOR FOR A DATA STORAGE DEVICE

(71) Applicant: Western Digital Technologies, Inc., Irvine, CA (US)

(72) Inventor: Arya Ahmadi-Ardakani, Mission Viejo, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 15/461,379

(22) Filed: Mar. 16, 2017

(65) Prior Publication Data

US 2017/0185341 A1    Jun. 29, 2017

Related U.S. Application Data

(63) Continuation of application No. 14/137,537, filed on Dec. 20, 2013, now Pat. No. 9,612,744.

(51) Int. Cl.
| | |
|---|---|
| *G06F 3/06* | (2006.01) |
| *H04W 4/029* | (2018.01) |
| *H04W 4/80* | (2018.01) |
| *H04L 29/08* | (2006.01) |

(52) U.S. Cl.
CPC .......... *G06F 3/0632* (2013.01); *G06F 3/0604* (2013.01); *G06F 3/067* (2013.01); *G06F 3/0653* (2013.01); *G06F 3/0671* (2013.01); *H04L 67/1097* (2013.01); *H04L 67/18* (2013.01); *H04W 4/029* (2018.02); *H04W 4/80* (2018.02); *G06F 2003/0697* (2013.01)

(58) Field of Classification Search
CPC ..................................... G06F 3/0653
See application file for complete search history.

(56) References Cited

U.S. PATENT DOCUMENTS

| | | | | |
|---|---|---|---|---|
| 2007/0296581 A1* | 12/2007 | Schnee | ................. | G06Q 10/08 340/572.1 |
| 2011/0307724 A1* | 12/2011 | Shaw | .................... | G06F 21/305 713/323 |
| 2017/0330100 A1* | 11/2017 | Bevan | .................... | G06N 7/005 |

* cited by examiner

*Primary Examiner* — Edward J Dudek, Jr.
(74) *Attorney, Agent, or Firm* — Chang & Hale LLP

(57) ABSTRACT

The present disclosure relates to a location-aware data storage device. The data storage device may record previous locations of the data storage device and may identify a pattern of use based on the previous locations. The data storage device may determine a predicted location based on the pattern of use and may activate a storage medium when the data storage device is within a predetermined proximity to the predicted location.

18 Claims, 5 Drawing Sheets

LOCATION-AWARE BEHAVIOR FOR A DATA STORAGE DEVICE

CROSS-REFERENCE TO RELATED APPLICATIONS

This application is a continuation of U.S. patent application Ser. No. 14/137,537, filed on Dec. 20, 2013, entitled LOCATION-AWARE BEHAVIOR FOR A DATA STORAGE DEVICE, the disclosure of which is hereby incorporated by reference in its entirety.

BACKGROUND

The responsiveness of a computing device is an important characteristic of its performance. Ideally, a computing device is able to respond to a user as quickly as possible.

For example, storage devices attempt to provide access to their stored data as efficiently and as quickly as possible. Today, solid-state drives (SSDs) have become popular due to their near-zero data access-time delay (DATD) performance relative to hard disk drives (HDDs). HDDs, however, still offer higher capacity storage at a lower cost relative to SSDs. Accordingly, HDDs remain popular due to their high capacity and durability. Indeed, many known products, such as solid state hybrid drives (SSHD) now provide a combination of SSD and HDD as a storage solution.

HDDs normally have a high DATD because they are frequently put into a standby mode in order to conserve power, etc. For example, mobile devices, such as a laptop, wireless Network Attached Storage (NAS), or any other mobile device, frequently employ aggressive HDD standby policies. HDDs may also be put into a standby mode for data safety reasons during various movements so that the head would not make contact with the disk.

Unfortunately, when exiting standby mode in response to a data access request, an HDD may take a long time for the drive to spin back up. Moreover, as the hard drive capacities increase, the DATD may also increase when coming out of standby mode.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
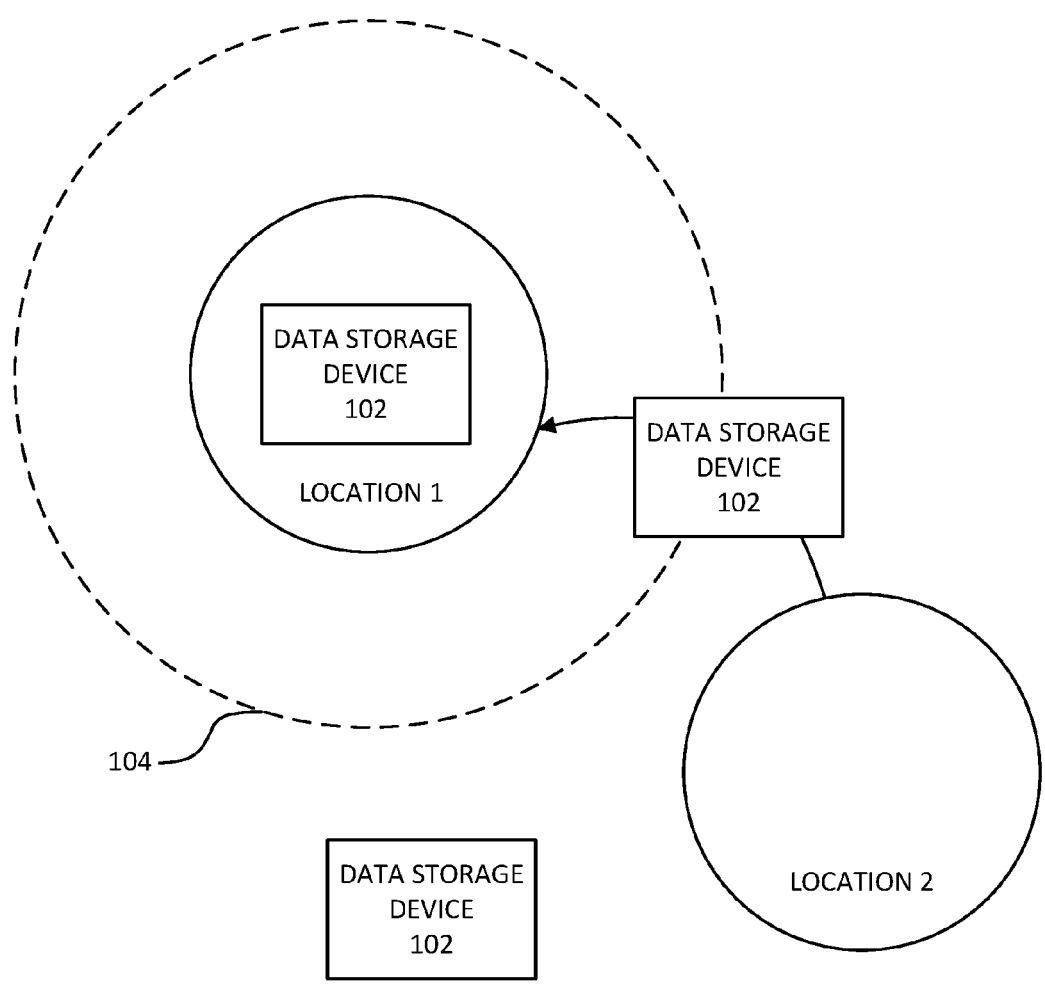
FIG. 1 depicts a data storage device in various locations according to an embodiment.

In an embodiment, a data storage device 102 is shown in an embodiment in FIG. 1. In an embodiment, the data storage device 102 comprises a network attached storage device ("NAS") or direct attached storage device ("DAS"). Furthermore, the data storage device 102 may comprise an electronic device such as a laptop, tablet, set top box, media player, or other electronic device which can store data. As shown in an embodiment shown in FIG. 1, the data storage device 102 may be located in various locations. For example, the data storage device 102 may be located outside of location 1 or location 2. Alternatively the data storage device 102 may originally be located in location 2, but be transitioning from location 2 to location 1. In an embodiment, the location of the data storage device 102 can dictate how the data storage device 102 behaves.

Figure 2:
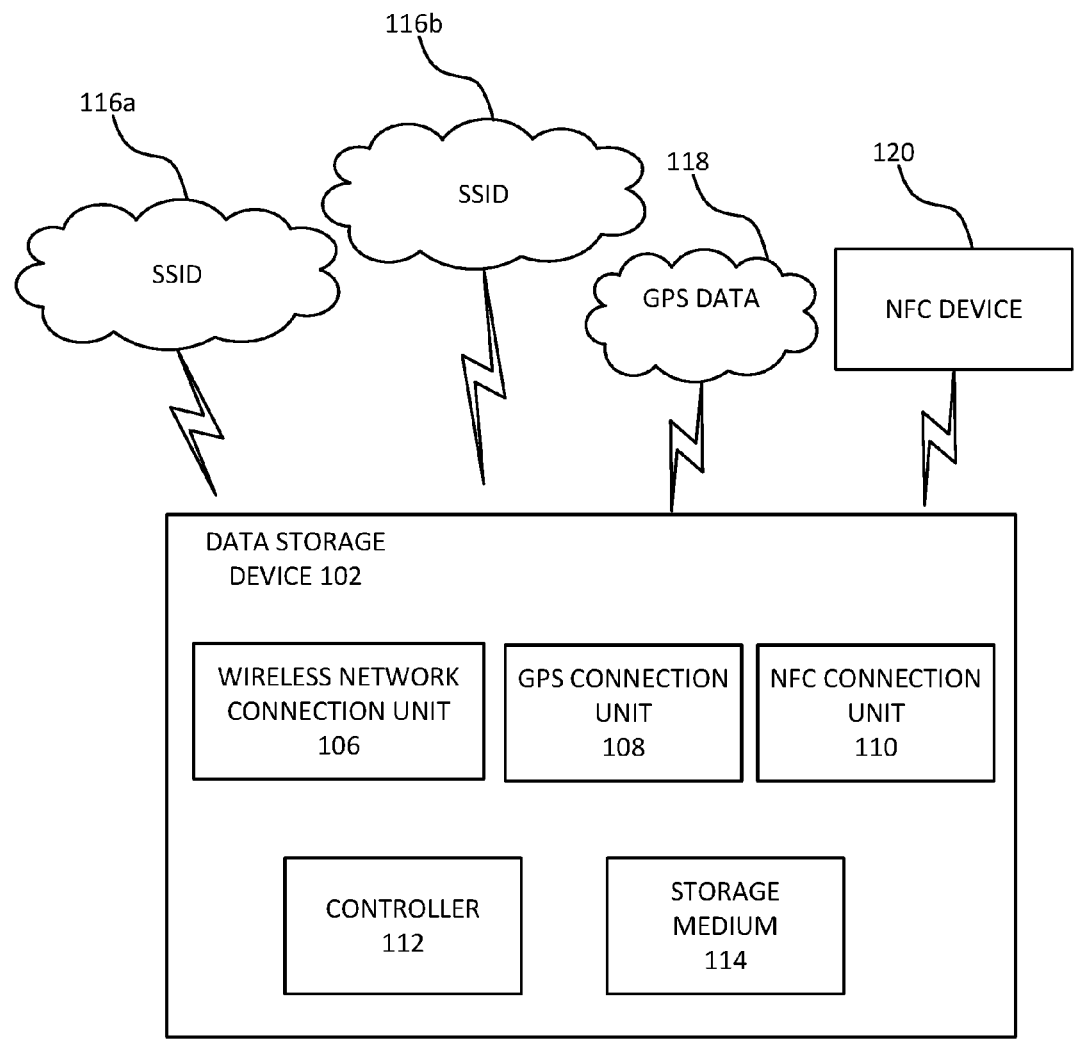
FIG. 2 depicts a data storage device according to an embodiment.

In an embodiment, to determine a location of the data storage device 102, the data storage device 102 can utilize wireless signals 104. In the embodiment shown in FIG. 2, the data storage device 102 comprises a wireless network connection unit 106, a global positioning system ("GPS") connection unit 108, a near field communications ("NFC") connection unit 110, a controller 112, and a storage medium 112. In an embodiment, the wireless signals 104 comprise wireless network signals, GPS information, and/or NFC signals.

In an embodiment, the wireless network connection unit 106 is configured to connect to one or more wireless networks and receive signals from the one or more wireless networks. In an embodiment, the signals can comprise wireless network data such as wireless network identification data. For example, the wireless network identification data could be service set identification data ("SSID") such as SSID 116a and/or SSID 116b. In an embodiment, the SSID can identify the wireless networks. In an embodiment, the wireless networks comprise a WiFi network. In an embodiment, the wireless networks comprise one or more routers.

The controller 112 can utilize, for example, the signals from the one or more wireless networks to determine a current location of the data storage device 102. For example, the storage medium 114 may comprise a list of SSID and their corresponding locations. Alternatively, the SSID themselves may be sufficient information by themselves as a location. In an embodiment, the controller 112 may require the reception of multiple SSIDs before a location is determined. For example, the controller 112 can utilize triangulation to determine where the data storage device 102 is located. This can improve the accuracy of a determination of where the data storage device 102 may be located.

In an embodiment, the wireless network connection unit 106 can also receive the Internet protocol ("IP") address of the one or more wireless networks. The controller 112 can then utilize the IP address of the one or more wireless networks to determine a location of the one or more wireless network and/or the location of the data storage device 102.

In an embodiment, the GPS connection unit 108 is configured to receive GPS information such as GPS data 118. In an embodiment the GPS data 118 provides information regarding a location of the data storage device 102. Thus, the controller 112 can utilize, for example, the GPS information to determine a current location of the data storage device 102. In an embodiment, the GPS data 118 comprises coordinate information about the location of the data storage device 102. For example, the coordinate information can comprise longitude information, latitude information, and/or altitude information.

In an embodiment, the NFC connection unit 110 is configured to receive NFC signals from a NFC device 120. In an embodiment, the NFC signals provide information regarding a location of the data storage device 102. Thus, the controller 112 can utilize, for example, the NFC signals to determine a current location of the data storage device 102. In an embodiment, the NFC signals indicate that the data storage device 102 is near the NFC device 120. If the NFC device 120 is at a known location, then the controller 112 can determine the approximate location of the data storage device 102.

In an embodiment, based on the current location of the data storage device 102, the data storage device 102 can determine whether to activate the storage medium 114 or not. In an embodiment, the storage medium 114 comprises a hard disk drive, a solid state drive, or any combination thereof. In an embodiment, the hard disk drive comprises a magnetic rotating disk, while the solid state drive comprises a solid state memory.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Furthermore, in an embodiment, activating the storage medium 114 comprises switching the storage medium 114 from a first operating mode to a second operating mode different than the first operating mode, wherein in the first operating mode, the storage medium 114 consumes less power than the second power state. In an embodiment, the first operating mode comprises a standby mode while the second operating mode comprises a normal operating mode. In an embodiment, this can reduce power consumption by the data storage device 102 while maintaining or substantially maintaining performance of the data storage device 102.

In an embodiment, activating the storage medium 114 comprises prefetching various files or types of files in the storage medium 114. For example, the storage medium 114 may prefetch recent documents when the controller 112 senses that the data storage device 102 is located within a user's work environment. However, the storage medium 114 may prefetch movies or other multimedia files when the controller 112 senses that the data storage device 102 is located within a user's home. In an embodiment, this can reduce fetch times for files and reduce the lag time before a user can play or view of the multimedia files.

In an embodiment, activating the storage medium 114 may allow access to various files depending on the location of the data storage device 102. Thus, the controller 112 may selectively activate the storage medium 114 depending on the location of the data storage device 102. Thus, the storage medium 114 will access various files depending on the location of the data storage device 102. In an embodiment, the controller 112 may deactivate or refrain from activating the storage medium 114 when the controller 112 wishes to restrict access to certain files based on the current location of the data storage device 102. In an embodiment, the data storage device 102 can provide security to files based on the current location of the data storage device 102.

In an embodiment, the files which are accessible based on the location of the data storage device 102 may be encrypted. In such a case, the data storage device 102 may decrypt the files only when the data storage device 102 is at a certain location. Alternatively, in an embodiment, the data storage device 102 may encrypt the files when the data storage device 102 is in a location where access to the files is not permitted. In an embodiment, the files may comprise data stored in the storage medium 114.

Figure 3:
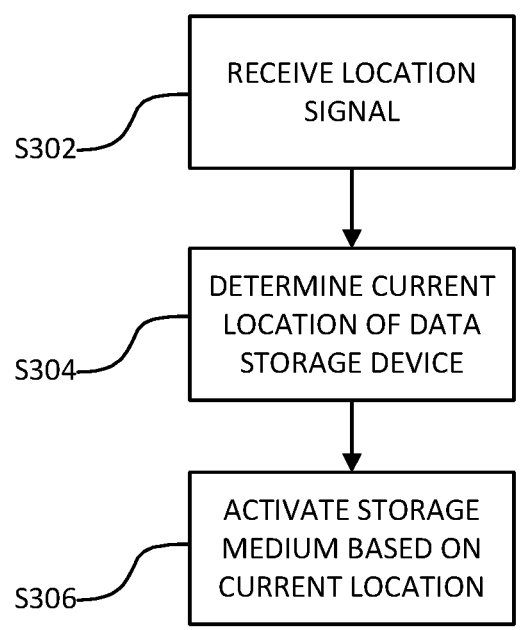
FIG. 3 depicts a process for managing a data storage device according to an embodiment.

In an embodiment, a process for managing the data storage device 102 is shown in FIG. 3. In block S302, the data storage device 102 receives a location signal. For example, the controller 112 can utilize the wireless connection unit 106, the GPS connection unit 108, and/or the NFC connection unit 110 to receive wireless network signals, GPS information, and/or NFC signals. In block S304, the data storage device 102 determines a current location of the data storage device 102. For example, the controller 112 can determine a current location of the data storage device utilizing the wireless network signals, GPS information, and/or NFC signals. In block S306, the data storage device 102 activates the storage medium 114 based on the current location of the data storage device 102. For example, the controller 112 can activate the storage medium 114 based on the current location of the data storage device 102.

Figure 4:
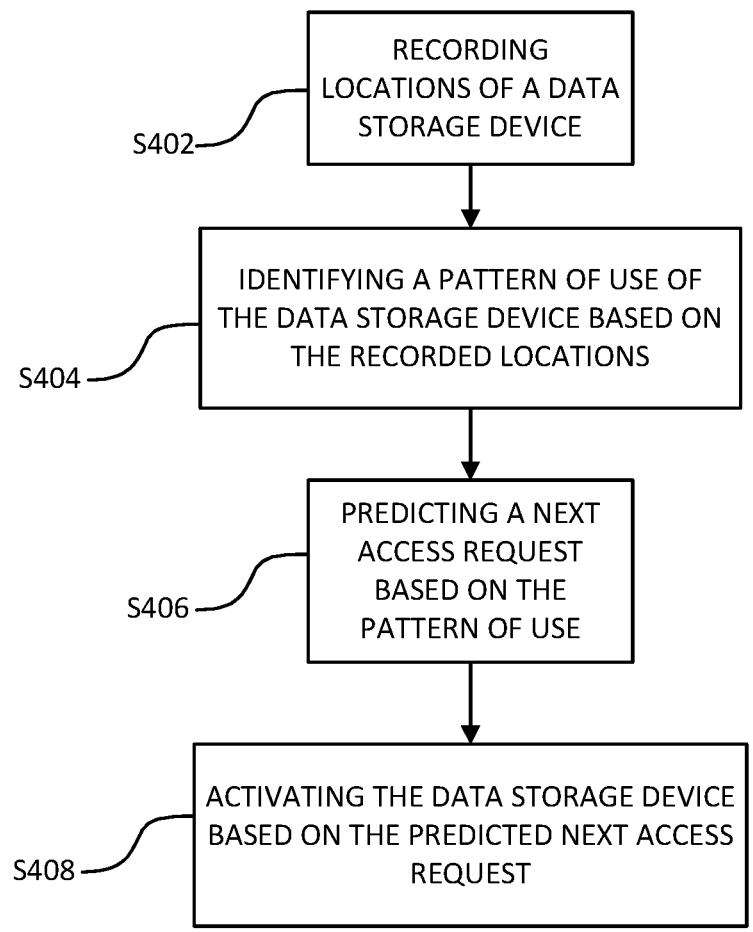
FIG. 4 depicts a process for predicting future access of a data storage device based on locations of the data storage device according to an embodiment.

In an embodiment, a process for predicting future access of the data storage device 102 based on locations of the data storage device 102 is shown in FIG. 4. In block S402, the locations of the data storage device 102 is recorded. For example, in an embodiment, the data storage device 102 is configured to record the location of the data storage device 102 to a location log for the data storage device 102. In an embodiment, the location log can be stored in the storage medium 114 or another memory in the data storage device 102. In such a case, the portion of the storage medium 114 or the memory in the data storage device 102 can be accessible by the controller 112 regardless of the location of the data storage device 102. In an embodiment, the recording locations of the data storage device 102 comprises receiving and/or recording GPS information, information from a set of wireless network identifiers, or NFC information.

In block S404 a pattern of use of the data storage device 102 is identified based on the recorded locations. For example, the controller 112 can analyze the recorded locations of the data storage device 102 to identifying a pattern of usage of the data storage device 102. In an embodiment, the controller 112 maintains an activity log corresponding to activities that were performed by the data storage device 102. The activity log can be matched up with the location log identify what activities were performed by the data storage device 102 when the data storage device 102 was being used, and at what location. For example, if the data storage device 102 accessed or requested access to certain files at a certain location, such information may be recorded in the activity log and/or the location log. The controller 112 can then analyze both the activity log and the location log to identify a pattern of usage of the data storage device 102.

In an embodiment, the activity log and the location log need not be separate files. Instead they can be a single file, or multiple files. Furthermore, the activity log and the location log may comprise a matrix. In addition, a plurality of access requests that occur within a location may be grouped together.

In block S406, a next access requests may be predicted based on the identified pattern. For example, the controller 112 may predict what file will be accessed next in the storage medium 114 based on the identified pattern. For example, if a certain multimedia file is usually accessed when the user is at home, then the controller 112 may predict that the certain multimedia file will be accessed when the data storage device 102 is at the user's home.

In block S408, the data storage device 102 may be activated based on the predicted next access request. For example, the controller 112 may determine when and how the storage medium 114 in the data storage device 102 should be activated based on the predicted next access request. For example, if the controller 112 predicts that the certain multimedia file will be accessed, the storage device 102 may prefetch the certain multimedia file. In an embodiment, this can improve a responsiveness of the data storage device 102.

In an embodiment, the data storage device 102 can also optionally receive program code that configures activation of the data storage device 102 based on a specific location. For example, the program code may indicate what types of activities the data storage device 102 should perform at what location. In an embodiment, the program code comprises a table, a spreadsheet, a log, a database, a data file or other information which may otherwise provide information to the data storage device 102 how to perform its activities based on locations of the data storage device 102. In an embodiment, the controller 112 can execute the program code or read the program code to configure activation of the data storage device 102 based on a specification location. In an embodiment, the activities performed by the data storage device 102 may be activities to improve its responsiveness.

Figure 5:
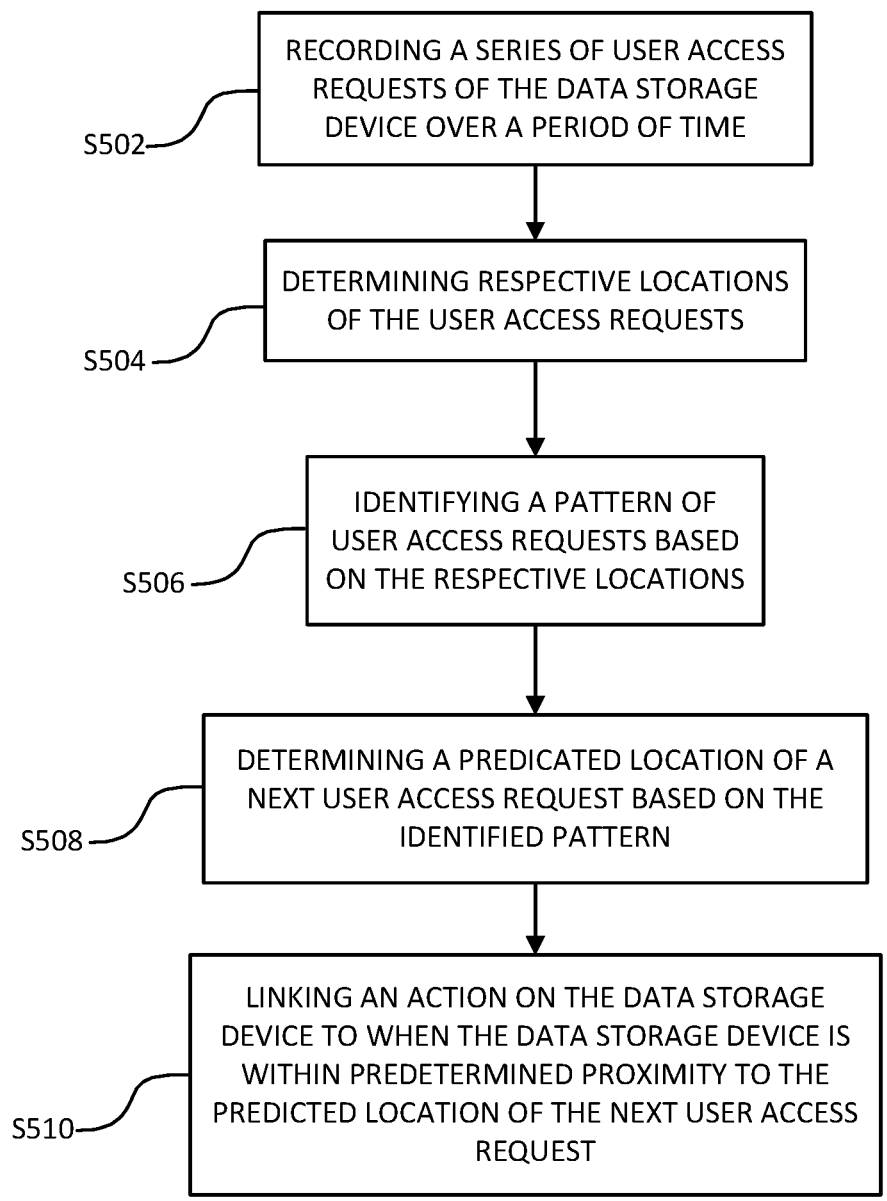
FIG. 5 depicts a process for managing a data storage device based on predicting a location of the data storage device according to an embodiment.

In an embodiment, a process for managing the data storage device 102 based on predicting a location of data storage device 102 is shown in FIG. 5. In block S502, a series of user access requests of the data storage device 102 is recorded over a period of time. For example, the controller 112 may record the user access requests in the data storage device 102. In an embodiment, the user access requests may be part of the activity log. In block S504, respective locations of the user access requests are identified. For example, the controller 112 can utilize the wireless network signals, GPS information, and/or NFC signals to determine the respective locations of the data storage device 102 when the user access requests are received and/or recorded. As previously noted, the wireless network signals could comprise determining a set of wireless network identifiers.

In block S506, a pattern of user access requests based on the respective locations is identified. For example, the controller 112 can analyze the user access requests to identify a pattern of user access requests. In an embodiment, the controller 112 identifies the pattern of user access by grouping a plurality of access requests that occur within a location.

In block S508, a predicted location of the next user access request is determined based on the identified pattern. For example, the controller 112 can predict where the data storage device 102 will be when it receives the next user access request. In block S510, an action on the data storage device 102 is linked to when the data storage device 102 is within a predetermined proximity to the predicted location of the next user access request. For example, the controller 112 can link an action that the data storage device should perform to when the data storage device 102 is within a predetermined proximity of the predicted location of the next user access request. In an embodiment, the action could include prefetching or accessing data. The action could also include disabling some functions of the data storage device 102. In an embodiment the proximity could be several inches, several feet, several yards, or other distances suitable for controlling functions of the data storage device 102. In an embodiment, the proximity could be determined by the number of wireless networks present.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. An apparatus, comprising:
a storage medium configured to store data; and
a controller configured to:
record previous locations of a data storage device;
identify a pattern of use of the data storage device based on the previous locations and based on correlating previously-performed activities of the data storage device with specific locations from the previous locations;
determine, based on the pattern of use, a predicted location of the data storage device and a predicted activity associated with the predicted location; and
in response to determining that the data storage device is within a predetermined proximity to the predicted location, prepare to perform the predicted activity, wherein preparing to perform the predicted activity comprises prefetching data stored in the storage medium.

2. The apparatus of claim 1, wherein the controller is configured to record the previous locations by:
receiving global positioning system information.

3. The apparatus of claim 1, wherein the controller is configured to record the previous locations by:
receiving signals from a set of wireless networks; and
recording a set of wireless network identifiers for the set of wireless networks.

4. The apparatus of claim 3, wherein the set of wireless networks comprises at least one WiFi network.

5. The apparatus of claim 1, wherein the controller is configured to record the previous locations by:
receiving near field communication signals from one or more other devices.

6. The apparatus of claim 1, wherein the controller is configured to identify the pattern of use by:
grouping a plurality of access requests that occur within a location.

7. The apparatus of claim 1, wherein the controller is configured to identify the pattern of use by:
arranging the previous locations in a matrix.

8. The apparatus of claim 1, wherein preparing to perform the predicted activity further comprises:
encrypting the prefetched data.

9. The apparatus of claim 1, wherein preparing to perform the predicted activity further comprises:
decrypting the prefetched data.

10. A method, comprising:
recording previous locations of a data storage device;
identifying a pattern of use of the data storage device based on the previous locations and based on correlating previously-performed activities of the data storage device with specific locations from the previous locations;
determining, based on the pattern of use, a predicted location of the data storage device and a predicted activity associated with the predicted location; and
in response to determining that the data storage device is within a predetermined proximity to the predicted location, preparing to perform the predicted activity, wherein preparing to perform the predicted activity comprises prefetching data stored in a storage medium of the data storage device.

11. The method of claim 10, wherein recording the previous locations comprises:
receiving global positioning system information.

12. The method of claim 10, wherein recording the previous locations comprises:
receiving signals from a set of wireless networks; and
recording a set of wireless network identifiers for the set of wireless networks.

13. The method of claim 10, wherein recording the previous locations comprises:
receiving near field communication signals from one or more other devices.

14. The method of claim 10, wherein identifying the pattern of use comprises:
grouping a plurality of access requests that occur within a location.

15. The method of claim 10, wherein identifying the pattern of use comprises:
arranging the previous locations in a matrix.

16. The method of claim 10, wherein preparing to perform the predicted activity further comprises:
encrypting the prefetched data.

17. The method of claim 10, wherein preparing to perform the predicted activity further comprises:
decrypting the prefetched data.

18. An apparatus, comprising:
means for storing data;
means for recording previous locations of a data storage device;
means for identifying a pattern of use of the data storage device based on the previous locations and based on correlating previously-performed activities of the data storage device with specific locations from the previous locations;
means for determining, based on the pattern of use, a predicted location of the data storage device and a predicted activity associated with the predicted location; and
means for preparing to perform the predicted activity, wherein preparing to perform the predicted activity comprises prefetching data in preparation of the predicted activity, in response to determining that the data storage device is within a predetermined proximity to the predicted location.

* * * * *